United States Patent
Hasegawa

(10) Patent No.: US 7,330,947 B2
(45) Date of Patent: Feb. 12, 2008

(54) METHOD AND APPARATUS FOR BACKING UP DATA IN VIRTUAL STORAGE MEDIUM

(75) Inventor: Takahiro Hasegawa, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 10/784,157

(22) Filed: Feb. 24, 2004

(65) Prior Publication Data

US 2004/0268070 A1 Dec. 30, 2004

(30) Foreign Application Priority Data

Jun. 24, 2003 (JP) ............................. 2003-179605

(51) Int. Cl.
*G06F 12/00* (2006.01)

(52) U.S. Cl. ...................... 711/162; 711/112

(58) Field of Classification Search ...................... None
See application file for complete search history.

(56) References Cited

U.S. PATENT DOCUMENTS 6,487,561 B1 * 11/2002 Ofek et al. .................. 707/204
7,076,620 B2 * 7/2006 Takeda et al. ............... 711/161
2003/0172230 A1 * 9/2003 Sasaki et al. ................ 711/112
2004/0172509 A1 * 9/2004 Takeda et al. ............... 711/162

FOREIGN PATENT DOCUMENTS

JP 62-026550 2/1987
JP 4-284549 10/1992

OTHER PUBLICATIONS

Structured Computer Organization, 2d edition, Tanenbaum, Prentice-Hall (c) 1984, pp. 10-12.*

* cited by examiner

*Primary Examiner*—Reginald Bragdon
*Assistant Examiner*—Horace L. Flournoy
(74) *Attorney, Agent, or Firm*—Staas & Halsey LLP

(57) ABSTRACT

A backup method, a backup apparatus, a program for executing a backup operation, and a recording medium for storing the program are disclosed for high-speed backup operations without any large-sized backup medium. The backup method backs up data stored in a first virtual recording medium into a backup medium under control of a virtual storage system. In the backup method, first, a second virtual recording medium is created to include a duplicate of only an actual data recording area, in which actual data are recorded, in a recording area of the first virtual recording medium. Then, backup data recorded in the second virtual recording medium are backed up into the backup medium.

9 Claims, 14 Drawing Sheets

| BACKUP METHOD | PROCESSING TIME | | REQUIRED BACKUP CAPACITY | |
|---|---|---|---|---|
| | DATA AMOUNT: SMALL | DATA AMOUNT: LARGE | DATA AMOUNT: SMALL | DATA AMOUNT: LARGE |
| FILE-BY-FILE BACKUP | 40 | 160 | 20 | 80 |
| ALL-DATA BACKUP | 100 | 100 | 100 | 100 |

FIG.10

| LOGICAL ADDRESS OF WORKING VIRTUAL DISK | BLOCK ADDRESS OF CORRESPONDING PHYSICAL DISK |
|---|---|
| A1 | 1 |
| A2 | 4 |
| A3 | 5 |
| A4 | 8 |
| A5 | UNUSED |
| A6 | UNUSED |
| A7 | 10 |
| A8 | 11 |
| A9 | 15 |
| A10 | 16 |
| ⋮ | ⋮ |
| ⋮ | ⋮ |

FIG.11

| LOGICAL ADDRESS OF WORKING VIRTUAL DISK | LOGICAL ADDRESS OF VIRTUAL COPY DISK |
|---|---|
| A1 | X1 |
| A2 | X2 |
| A3 | X3 |
| A4 | X4 |
| A7 | X5 |
| A8 | X6 |
| A9 | X7 |
| A10 | X8 |
| ⋮ | ⋮ |
| ⋮ | ⋮ |
| ⋮ | ⋮ |
| ⋮ | ⋮ |

FIG.12

| LOGICAL ADDRESS OF VIRTUAL COPY DISK | BLOCK ADDRESS OF CORRESPONDING PHYSICAL DISK |
|---|---|
| X1 | 101 |
| X2 | 102 |
| X3 | 103 |
| X4 | 104 |
| X5 | 105 |
| X6 | 106 |
| X7 | 107 |
| X8 | 108 |
| X9 | 109 |
| X10 | 110 |
| ⋮ | ⋮ |
| ⋮ | ⋮ |

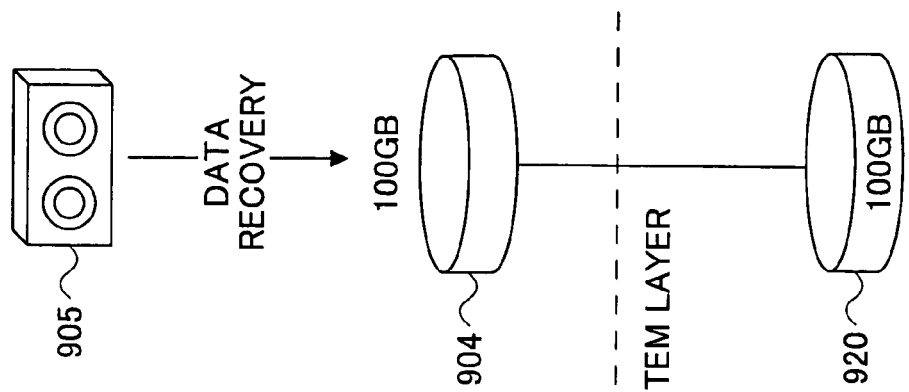
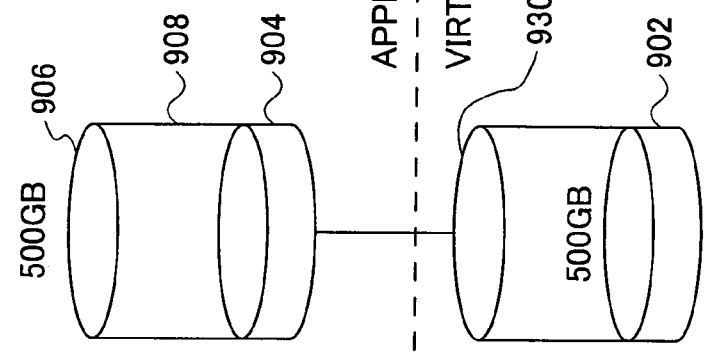
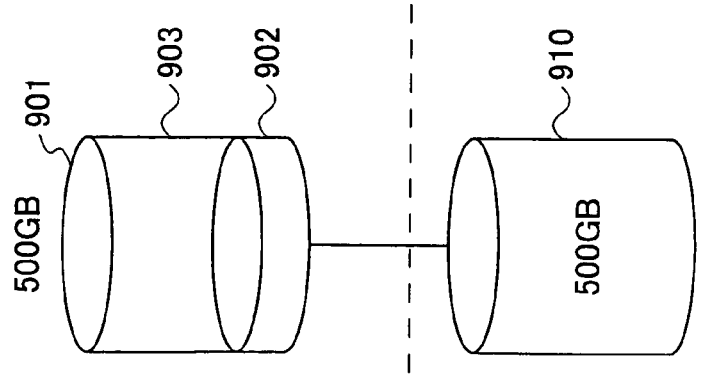

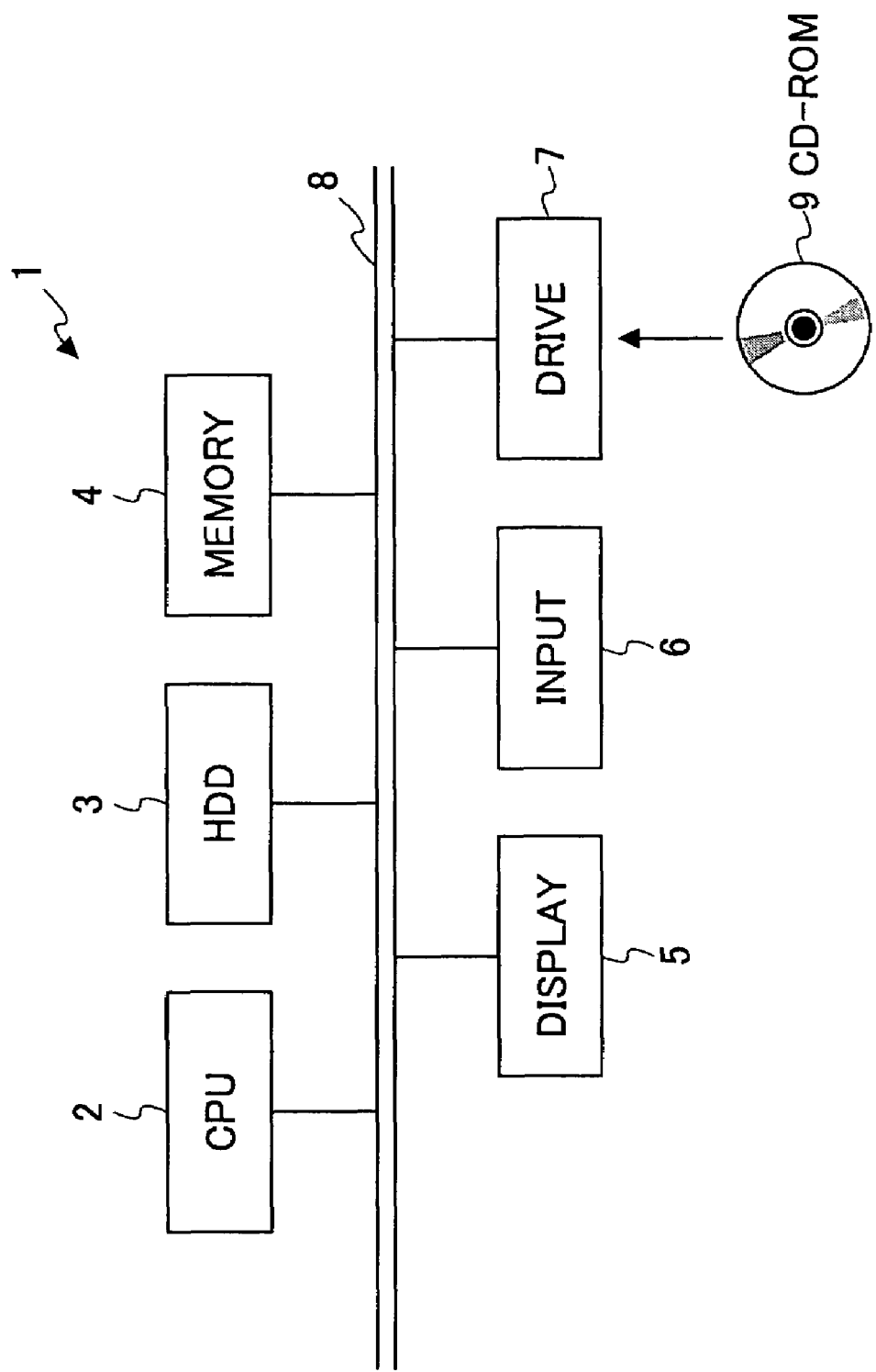

METHOD AND APPARATUS FOR BACKING UP DATA IN VIRTUAL STORAGE MEDIUM

CROSS-REFERENCE TO RELATED APPLICATIONS

The present application is based on Japanese priority application No. 2003-179605 filed Jun. 24, 2003, the entire contents of which are hereby incorporated by reference.

BACKGROUND OF THE INVENTION

1. Field of the Invention

The present invention generally relates to backup operations on data stored in a data recording device, and more particularly to backup operations on data stored in a data recording device or a data storage device such as a disk device.

2. Description of the Related Art

FIG. 1 shows an exemplary structure of a conventional backup system 100 to perform data backup operations, for example, to copy data from a disk apparatus to a backup apparatus such as a tape apparatus, in a virtual storage system environment.

Referring to FIG. 1, the backup system 100 includes a PC (Personal Computer) server 101, a physical disk apparatus 103, a server 105 and a backup apparatus 106. The PC server 101 includes a virtual disk control part 102 and an inner bus 104. The virtual disk control part 102 controls a virtual storage system in such a way that virtual disks can be associated with the physical disk apparatus 103 and be externally used as disk devices by the PC server 101. The server 105 also includes an inner bus 107 and is coupled to the backup apparatus 106. The PC server 101 is connected to the server 105 via a high-speed bus 110 such as a fiber channel (FC).

In such a system configuration, data recorded in disks in the physical disk apparatus 103 are backed up to the backup apparatus 106.

In accordance with a conventional backup method of backing up data recorded in a disk apparatus in a virtual storage system environment, first, a copy of a disk to be backed up is created in a virtual storage system layer. Then, data in the created copy disk are backed up, for example, to the backup apparatus 106 such as a tape apparatus. According to the conventional backup method, it is possible to shorten operation halt time of the disk during the data backup operation on the disk.

In the conventional backup method, in addition, the copy disk is fictitiously created to shorten time to create the copy disk. As a result, it is possible to further shorten the operation halt time during the data backup operation. In this case, however, it is required that the capacity of the copy disk be greater than or equal to that of a currently operating source disk.

On the other hand, there are types of data backup methods to back up data from the copy disk to the backup apparatus such as a tape apparatus, typically, file-by-file backup manner and all-block backup (or raw device backup) manner. In the all-block backup manner, data recorded in a disk are backed up into a backup apparatus from the head block to the last block of the disk sequentially in such a way that the backup data can have a block-wise one-to-one correspondence between the disk and the backup apparatus.

A detailed description is given, with reference to FIG. 2 through FIG. 6, of a virtual storage system, a fictitious disk creation method and a backup method according to the prior art.

First, a conventional virtual storage system is described.

FIGS. 2A through 2C are diagrams to explain an exemplary operation of a conventional virtual storage system.

In FIG. 2A, a virtual disk 210 of 500 GB (Giga Byte) is illustrated. In FIG. 2C, a physical disk 220 of 10 GB is illustrated. In FIG. 2B, an address conversion table and an allocation information table, which are collectively designated by the reference numeral 230, to indicate a correspondence between the virtual disk 210 and the physical disk 220 are illustrated.

In such a virtual storage system, a disk (virtual disk) is virtually created from a physical storage (physical disk), and the created virtual disk is provided to a server. The server can access the virtual disk as though the server accessed the physical disk.

In such a virtual storage system, a virtual disk is created as a virtual disk so that the virtual disk can have a capacity greater than that of a real physical storage (physical disk). Then, when a write request to the virtual disk is issued, a required recording area in the physical disk is allocated. This allocation is managed by using an allocation information table in the virtual storage system.

Thus, if there is a recording area in the virtual disk to which no write request has been issued, the recording area is not allocated to any recording area in the physical disk.

Next, an exemplary operation of a conventional virtual storage system to allocate a required recording area in a physical disk is described.

First, the virtual storage system creates a virtual disk 210 illustrated in FIG. 2A. It is noted that no data is written in the virtual disk 210 at this time.

Then, write accesses 211 and 212 to the virtual disk 210 are provided from a server. Required storage areas 221 and 222 in the physical disk 220 are not allocated to the write accesses 211 and 212, respectively, until such write requests to the virtual disk 210 are issued. This allocation is described in portions 231 and 232 of the allocation information table 230 so as to be manageable under the address conversion table and the allocation information table 230.

Subsequently, once the server accesses a logical address in the virtual disk 210 corresponding to an allocated area in the physical disk 220, the virtual storage system uses the address conversion table and the allocation information table 230 to perform an address conversion to access the physical disk 220.

Next, a fictitious disk copying method is described with reference to FIG. 3 and FIG. 4.

FIG. 3 is a diagram to explain a conventional fictitious disk copying method. FIGS. 4A and 4B are sequence diagrams of the fictitious disk copying method.

The fictitious disk copying method is defined as a method of fictitiously create a copy (copy disk) of a source disk in a short time. In response to an instruction to create a copy disk, a data block table is created for the source disk. In accordance with the fictitious disk copying method, it is considered that when the data block table is created, the copying operation has been completed. Such a data block table is defined as a table having information to indicate whether a block address of a copy disk and a corresponding block address of a source disk have been updated. Thus, at creation time of a data block table, the data block table includes no information to indicate whether an update operation has been performed.

In FIG. 3, a source disk 301 is illustrated as a currently working disk. In response to receipt of an instruction 310 to duplicate the source disk 301 from a server, the virtual storage system creates a data block table 302 for the source disk 301.

As shown in FIG. 4A, when such a copying instruction 310 is issued from the server during an operation period 401 of the source disk 301, the operation of the source disk 301 is temporarily halted in an time interval 402, and the data block table 302 is created for the source disk 301. Immediately after the creation of the data block table 302, the operation of the source disk 301 is restarted in an operation period 403. It is noted that a copy disk 303 as illustrated in FIG. 3 is not created at this time.

At the next step, the copying operation from the source disk 301 to the copy disk 303 is started. At the same time, a backup operation 404 from the copy disk 303 to a backup apparatus 304 is started. Fundamentally, individual data items in the source disk 301 are sequentially copied to the copy disk 303.

However, if an update request to update data in the source disk 301 is issued from a server, a block to be updated in the source disk 301 is copied to the copy disk 303 prior to updating of the source disk 301, and then update information to indicate that the update operation has been performed on the block to be updated is added in the data block table 302 of the source disk 301.

On the other hand, when a read request for backup data is issued, there may be a case where data have not been copied from the source disk 301 to the copy disk 303. In this case, the copying operation from the source disk 301 to the copy disk 303 is started.

According to the above-mentioned method, it is possible to fictitiously create a copy of a disk in a short time.

Finally, a conventional backup method is described with reference to FIG. 5 and FIG. 6.

As typical backup methods of backing up data in the above-mentioned copy disk to a backup apparatus such as a tape apparatus, there are two approaches: file-by-file backup method and all-data backup method (raw device level backup method). In accordance with the file-by-file backup method, only files stored in the copy disk are backed up to the backup apparatus. On the other hand, in accordance with the all-data backup method, all data of the copy disk are backed up to the backup apparatus regardless of file configuration and other factors.

FIG. 5 is a diagram to explain the file-by-file backup method and the all-data backup method.

In the file-by-file backup method, only actual data 502 stored in recording areas in a virtual disk 501 corresponding to a physical disk are backed up. As a result, it is possible to back up the actual data 502 into a backup medium 504 having a minimum capacity required for backup data 505 corresponding to the actual data 502. However, if the actual data 502 contain a large number of files, random accesses may occur frequently. Thus, in this case, a longer processing time would be required for the backup operation.

On the other hand, in the all-data backup method, since individual blocks in the copy disk are sequentially accessed from the head block thereof, it is possible to access the blocks at a high speed. However, an unused area 503 in the virtual disk is also backed up. As a result, even if the size of the actual data 502 is smaller than the total capacity of the virtual disk 501, it is necessary to prepare a large-sized backup medium 506 to store the backup data 507 having the same size as the total capacity of the virtual disk 501.

FIG. 6 shows an exemplary table for comparing the two methods with respect to processing time and backup capacity required to back up 100 GB disk. In the illustrated table, the column "DATA AMOUNT: SMALL" represents a case where the size of the actual data is 20 GB, and on other hand, the column "DATA AMOUNT: LARGE" represents a case where the size of the actual data is 80 GB. Also, it is supposed that the block access time of the file-by-file backup method is twice as large as that of the all-data backup method. Under such conditions, the two backup methods are compared with respect to the processing time and the required backup capacity. In the illustrated table, the processing time and the backup capacity for the all-data backup method are considered as 100s, respectively. Except for the processing time in the case of the large data amount, the all-data backup method has longer processing time and larger required backup capacity than the file-by-file backup method does, as illustrated in FIG. 6.

On the other hand, the file-by-file backup method has longer processing time in the case of the large data amount.

Japanese Laid-Open Patent Applications No. 62-026550 and No. 04-284549 disclose techniques related to the present invention.

FIG. 7 is a diagram to explain an object to be solved by the present invention.

As mentioned above, it is possible to shorten the operation halt time of a source disk during backup operation by fictitiously creating a copy of a disk. However, conventional methods have a defect in that the capacity of a copy disk 702, for example, even if only 10 GB data are recorded in a source disk 701, has to be larger than or equal to the total capacity of the source disk 701 such as 1 TB (Tera Bytes).

In addition, in accordance with the all-data backup method, the entire disk of 1 TB is backed up in the illustrated case regardless of amounts of actual data recorded in the source disk 701. Thus, unnecessary data are backed up, resulting in increases in processing time.

Furthermore, even if only 10 GB data are stored in the source disk 701, it is necessary to prepare a backup medium 703, for example, having a capacity larger than or equal to 1 TB, in accordance with conventional backup methods.

Although the all-data backup method and the file-by-file backup method can be selectively used depending on amounts of actual data recorded in the source disk 701, such selection may increase workloads in practice.

SUMMARY OF THE INVENTION

It is a general object of the present invention to provide a backup method and a backup apparatus in which one or more of the above-mentioned problems are eliminated.

A more specific object of the present invention is to provide a backup method and a backup apparatus that can realize high speed backup operations without necessity of a large-sized backup medium.

In order to achieve the above-mentioned objects, there is provided according to one aspect of the present invention a method of backing up data stored in a first virtual recording medium into a backup medium under control of a virtual storage system, including the steps of: creating a second virtual recording medium including a duplicate of only an actual data recording area, in which actual data are recorded, in a recording area of the first virtual recording medium; and backing up backup data recorded in the second virtual recording medium into the backup medium.

In an embodiment of the present invention, the method may further include the step of: recording a block correspondence table in the second virtual recording medium, wherein the block correspondence table indicates a correspondence between at least one address for storing the actual data of the first virtual recording medium and at least one address for storing the backup data of the second virtual recording medium.

In an embodiment of the present invention, the step of backing up may include backing up all backup data recorded in the second virtual recording medium into the backup medium sequentially.

Additionally, there is provided according to another aspect of the present invention a backup apparatus for backing up data recorded in a first virtual recording medium into a backup medium under control of a virtual storage system, including: a creation part creating a second virtual recording medium including a duplicate of only an actual data recording area, in which actual data are recorded, in a recording area of the first virtual recording medium; and a backup part backing up backup data recorded in the second virtual recording medium into the backup medium.

Furthermore, the present invention is provided as a program to cause a computer to execute the above-mentioned backup method and a computer readable recording medium for storing the program.

According to one aspect of the present invention, it is possible to realize a backup method and a backup apparatus that can perform a backup operation at a high speed without any large-sized backup medium.

Other objects, features and advantages of the present invention will become more apparent from the following detailed description when read in conjunction with the accompanying drawings.

BRIEF DESCRIPTION OF THE DRAWINGS

FIG. 10 shows an exemplary allocation information table to represent a correspondence between logical addresses in a working disk and block addresses in a corresponding physical disk according to the first embodiment;

FIG. 11 shows an exemplary block correspondence table to indicate a correspondence between logical addresses in the copy disk and logical addresses in the working disk according to the first embodiment;

FIG. 12 shows an exemplary allocation information table to indicate a correspondence between logical addresses in the copy disk and block addresses of a corresponding physical disk according to the first embodiment;

FIGS. 14A through 14C are diagrams to explain a recovery operation on backup data according to a second embodiment according to the present invention; and FIG. 15 shows an exemplary structure of a computer system to implement the backup method according to the present invention.

DETAILED DESCRIPTION OF THE PREFERRED EMBODIMENTS

In the following, embodiments of the present invention will be described with reference to the accompanying drawings.

Figure 8:
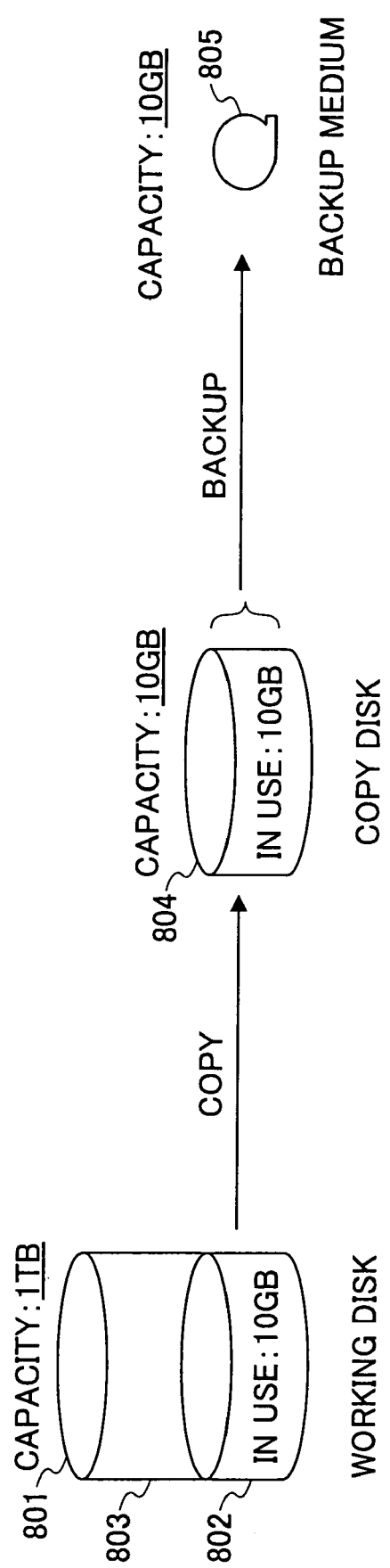
FIG. 8 is a diagram to explain a principle of the present invention.

A description is given, with reference to FIG. 8, of a principle of the present invention.

FIG. 8 is a diagram to explain a principle of the present invention.

Referring to FIG. 8, a working disk 801 includes an actually used area 802 for storing actual data and an empty area 803. In the illustration, for example, the working disk 801 has the total capacity of 1 TB, and on the other hand, the actually used area 802 has the size of 10 GB.

In an exemplary backup operation according to the present invention, a copy disk 804 is created as a disk having the capacity of 10 GB equal to the size of the actually used area 802.

Then, the copy disk 804 is backed up in a backup medium 805 in all-data backup manner. As a result, the backup medium 805 has to have only the capacity of 10 GB rather than 1 TB. In addition, only the processing time required to write the 10 GB data in the backup medium 805 is expended as the processing time of the backup operation according to the present invention.

As mentioned above, in accordance with the present invention, the copy disk 804 is created to have the same capacity as the actually used area 802 of the working disk 801, and then the copy disk 804 is backed up in the backup medium 805 in all-data backup manner. As a result, it is possible to realize a backup method and a backup apparatus that can perform high speed backup operations without any large-sized backup medium.

A description is given, with reference to FIG. 9 through FIG. 12, of a first embodiment of the present invention.

Figure 9:
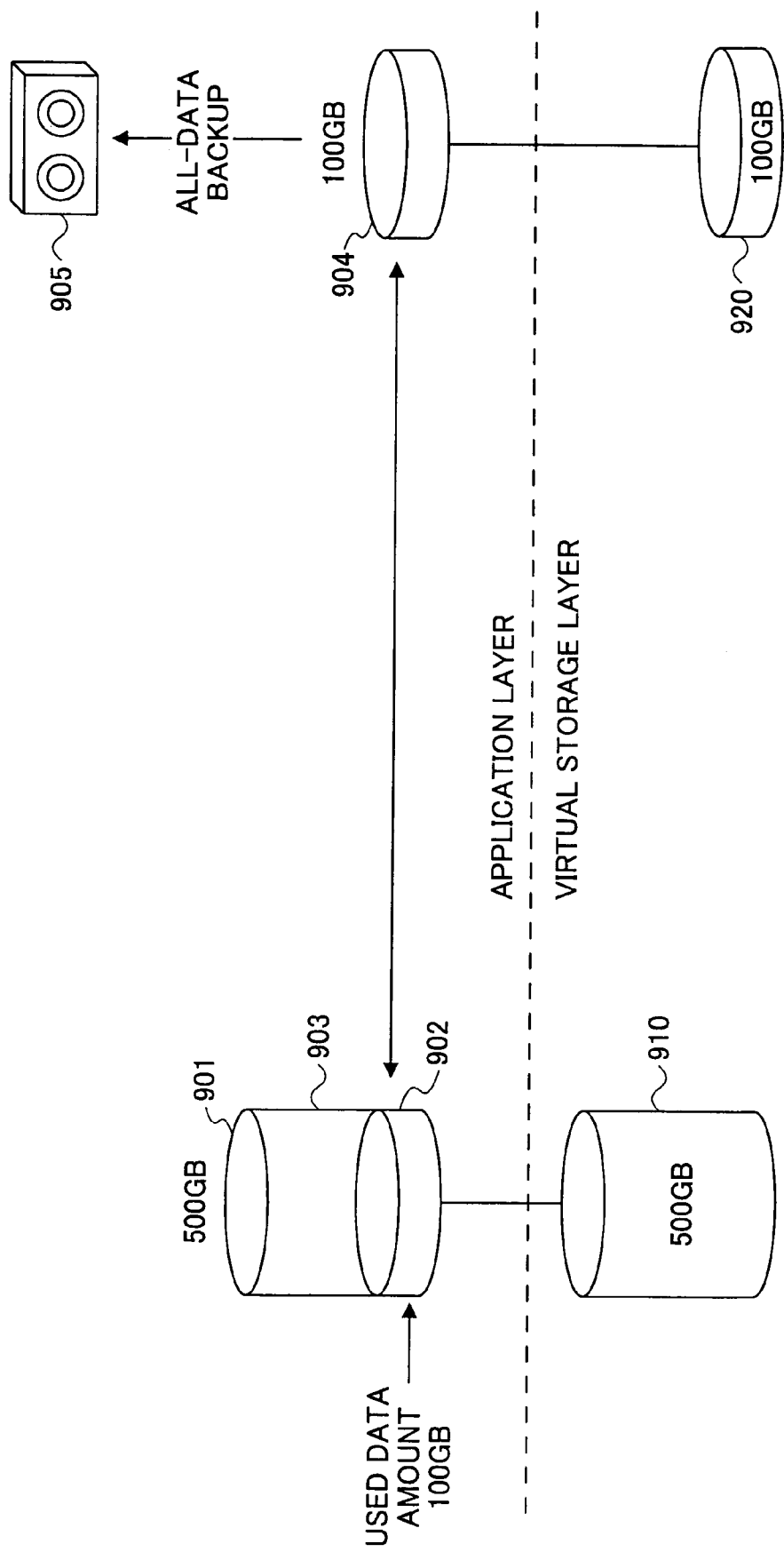
FIG. 9 shows an exemplary disk relationship between an application layer and a virtual storage layer according to a first embodiment of the present invention.

FIG. 9 shows an exemplary disk relationship between an application layer and a virtual storage layer.

Referring to FIG. 9, a working disk 901 is operable from the application layer. The working disk 901 includes an actually used area 902 for storing actual data and an empty area 903. In the illustration, the actually used area 902 has the size of 100 GB. In the virtual storage system layer, the working disk 901 is set as a virtual disk 910 having the total capacity of 500 GB.

The virtual disk 910 includes virtual disk information. For example, the virtual disk information may include disk capacity information and an allocation information table. In the illustrated virtual disk 910, the disk capacity information indicates that the disk capacity of the virtual disk 910 is 500 GB.

FIG. 10 shows an exemplary allocation information table to represent a correspondence between logical addresses in the working disk 901 and block addresses in the corresponding physical disk.

Referring to FIG. 10, the allocation information table indicates a correspondence between logical addresses A1, A2, . . . of the working disk 901 set as the virtual disk 910 having the capacity of 500 GB and block addresses of the allocated physical disk. From the allocation information table illustrated in FIG. 10, it can be observed that the logical address A1, A2, A3 and A4 of the working disk 901 correspond to the block address 1, 4, 5 and 8, respectively, of the physical disk. Also, the logical address A5 of the working disk 901 is not used (unused), which means that the logical address A5 is not allocated to any block address of the physical disk.

Then, the operational disk 901 is copied to a copy disk 904 in the application layer. Since the copy disk 904 is created as a duplicate of the working disk 901, the copy disk 904 is conventionally created to have the same total capacity as the working disk 901. In such a case, the copy disk 904 would be created as a 500 GB virtual disk in the virtual storage layer. However, in accordance with this embodiment, the copy disk 904 is created as a virtual disk 920 having the same capacity of 100 GB as the size of the actually used area 902 of the working disk 901.

Since the actually used area 902 has the size of 100 GB, it is concluded that the working disk 901 can include an unused area such as the logical address A5 illustrated in FIG. 10. By truncating such unused areas, the copy disk 904 is created to store a sequence of data elements recorded in the actually used area 902 in individual logical addresses sequentially.

FIG. 11 shows an exemplary block correspondence table to indicate a correspondence between logical addresses in the copy disk 904 and logical addresses in the working disk 901. FIG. 12 shows an exemplary allocation information table to indicate a correspondence between logical addresses in the copy disk 904 and block addresses in a corresponding physical disk.

When the copy disk 904 is created, a block correspondence table as illustrated in FIG. 11 is created, and then an allocation information table as illustrated in FIG. 12 is created.

By using FIG. 10 through FIG. 12, data stored in block addresses of the physical disk corresponding to the working disk 901, which is used as the virtual disk 910 having the capacity of 500 GB, are copied to block addresses of the physical disk corresponding to the copy disk 904, which is used as the virtual disk 920 having the capacity of 100 GB.

In the illustrated example, with reference to FIG. 12, it is observed that the logical address X1 in the copy disk 904 corresponds to the block address 101 in the physical disk corresponding to the copy disk 904. Also, with reference to FIG. 11, it is observed that the logical address A1 in the working disk 901 corresponds to the logical address X1. Also, with reference to FIG. 10, it is observed that the block address 1 in the physical disk corresponding to the working disk 901 corresponds to the logical address A1 in the working disk 901. Accordingly, data stored in the block address 1 in the physical disk corresponding to the working disk 901 are copied to the block address 101 in the physical disk corresponding to the copy disk 904. In this fashion, the copy disk 904 can be created as the virtual disk 920 having the total capacity of 100 GB from the working disk 901 having the total capacity of 500 GB including the actually used area 902 of 100 GB.

Finally, the allocation information table shown in FIG. 10 and the block correspondence table shown in FIG. 11 are recorded in the copy disk 904. By storing the allocation information table and the block correspondence table in the copy disk 904, when the backup data are recovered, it is possible to recover the source data from the backup data and store the recovered data elements into appropriate block addresses in the physical disk corresponding to the working disk 901.

Then, the created copy disk 904 is backed up in the backup medium 905 in the all-data backup manner. At this time, the allocation information table and the block correspondence table are also recorded in the backup medium 905.

According to the first embodiment of the present invention, it is possible to realize a backup method and a backup apparatus that can perform a backup operation at a high speed without any large-sized backup medium by creating the copy disk 904 and backing up all data in the copy disk 904.

Figure 13:
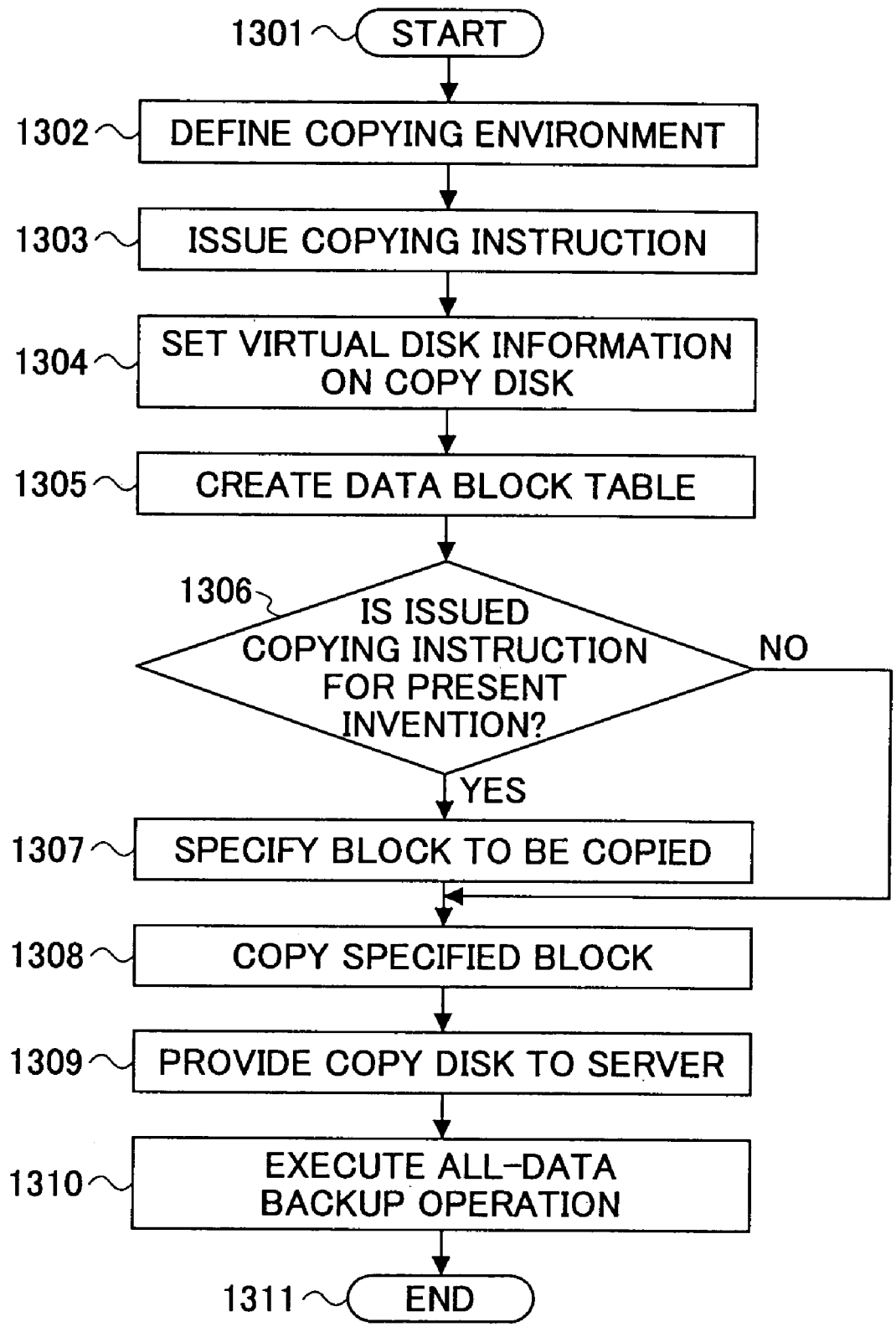
FIG. 13 is a flowchart of a backup method according to the first embodiment.

FIG. 13 is a flowchart of a backup method according to the first embodiment of the present invention.

Referring to FIG. 13, the backup method starts with step 1301.

At step 1302, a copying environment is defined. Specifically, in this example, the total capacity of the working disk 901, which serves as a source disk, is set as 500 GB, and an allocation information table is created for the working disk 901. Then, it is checked that the actually used area 902 of the working disk 901 has 100 GB.

At step 1303, an instruction to create a copy disk 904 is issued from a server.

At step 1304, virtual disk information on the copy disk 904 is set. Specifically, in this example, the capacity of the copy disk 904 is set as not 500 GB but 100 GB corresponding to the actually used area 902 in the working disk 901. At the same time, the allocation information table on the working disk 901 is copied to the copy disk 904.

Figure 1:
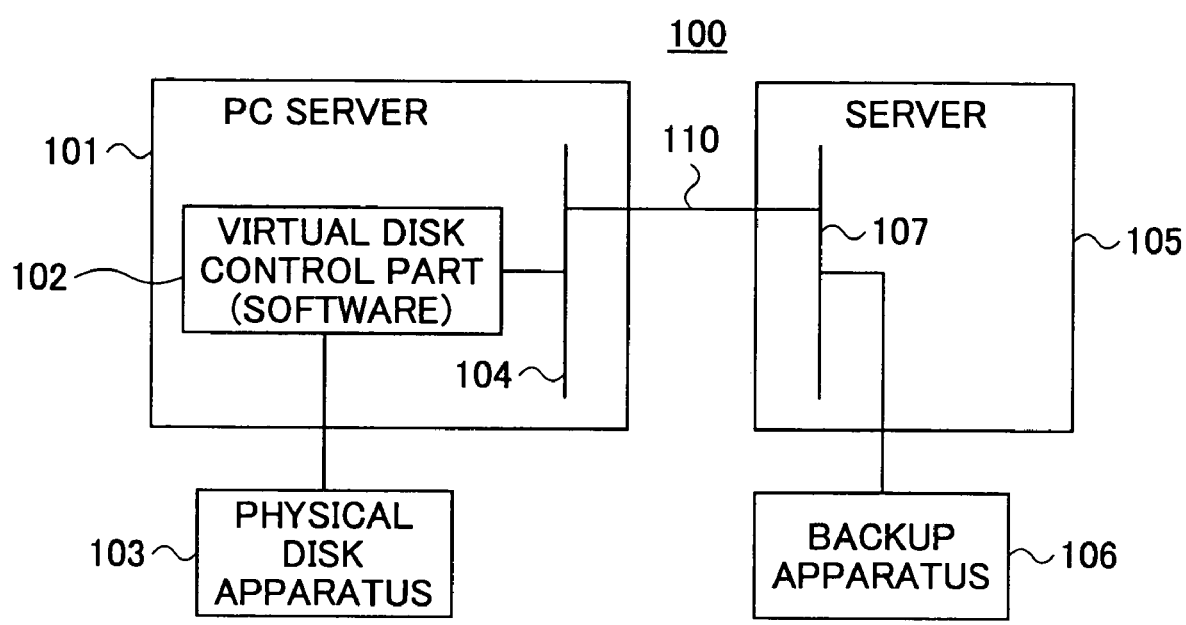
FIG. 1 shows an exemplary structure of a conventional backup system to perform a data backup operation to copy data from a disk apparatus to a backup apparatus.
Figure 2:
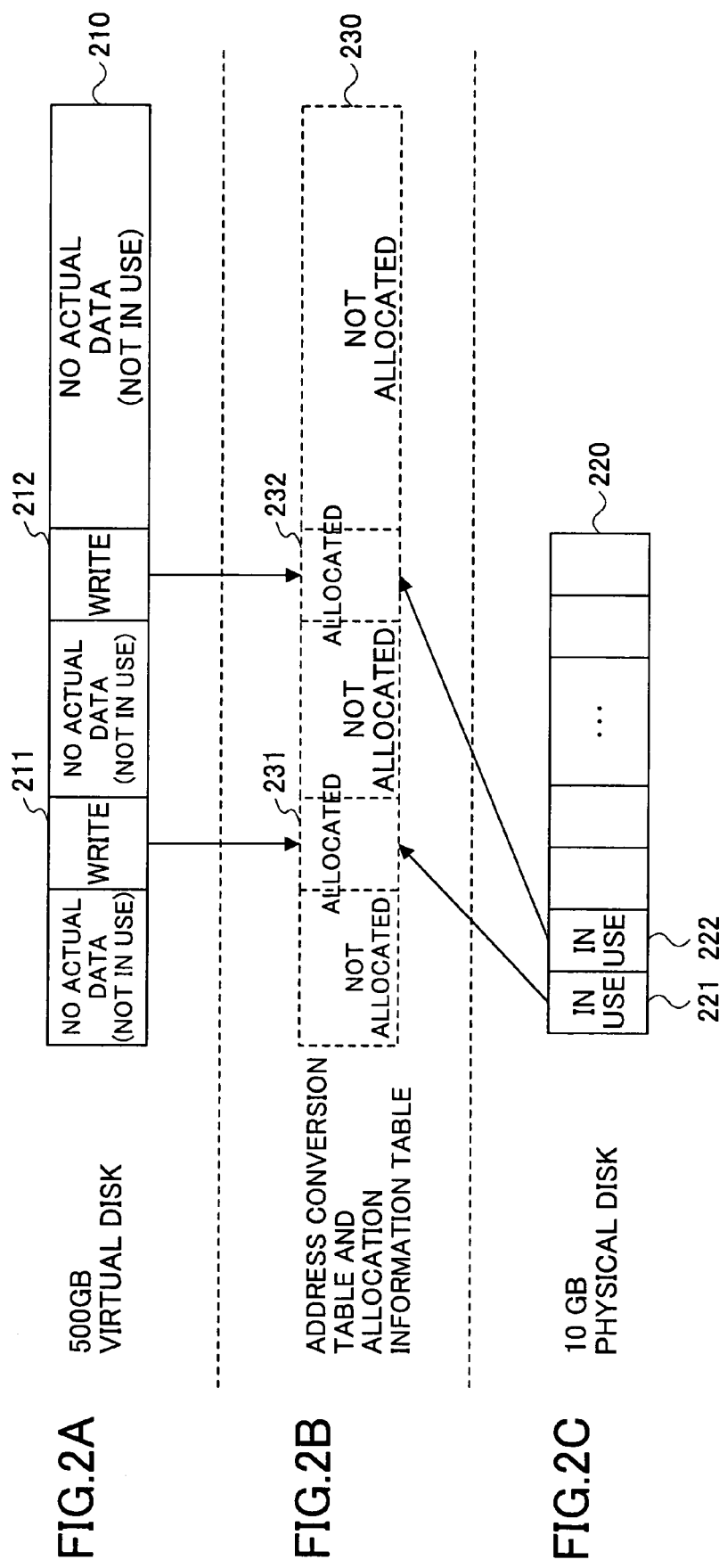
FIGS. 2A through 2C are diagrams to explain an exemplary operation of a conventional virtual storage system.
Figure 3:
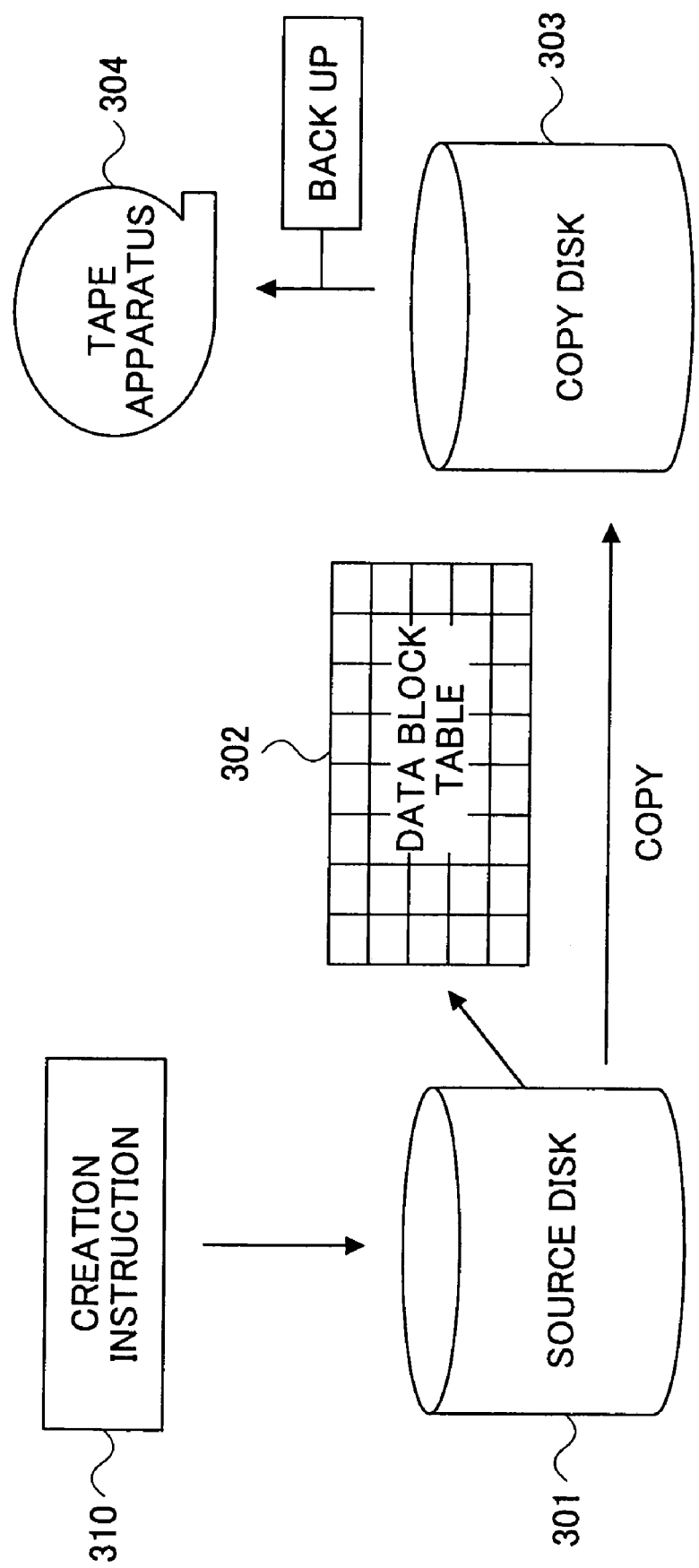
FIG. 3 is a diagram to explain a conventional fictitious disk copying method.
Figure 4:
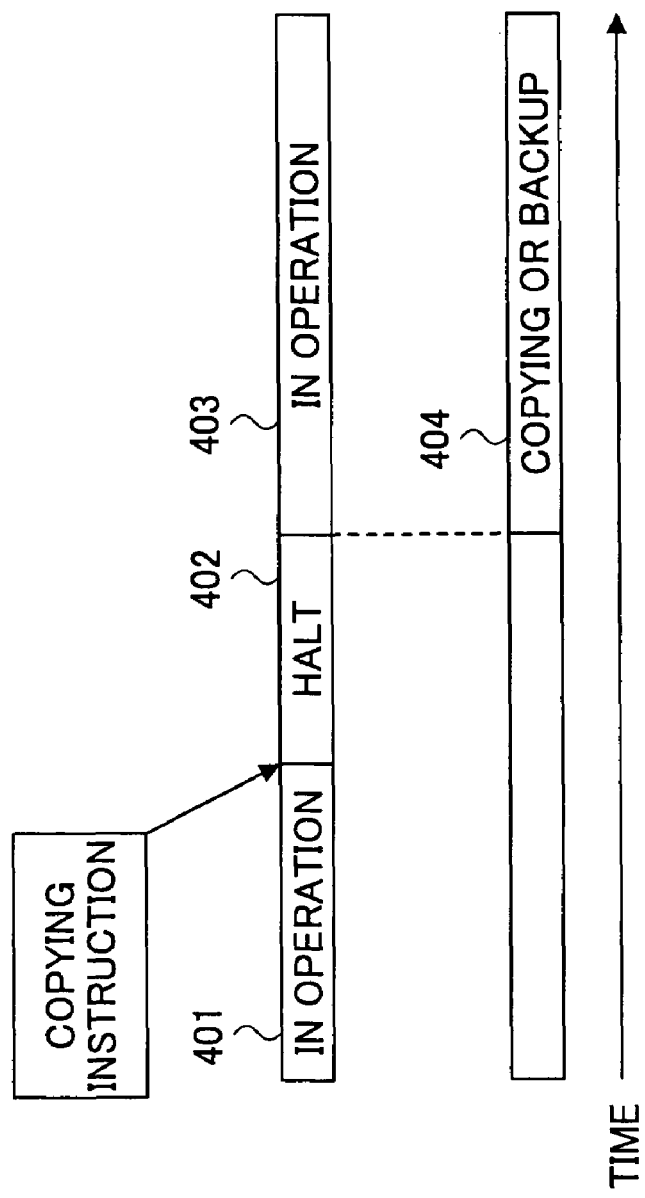
FIGS. 4A and 4B are sequence diagrams of the fictitious disk copying method shown in FIG. 3.
Figures 5, 6:
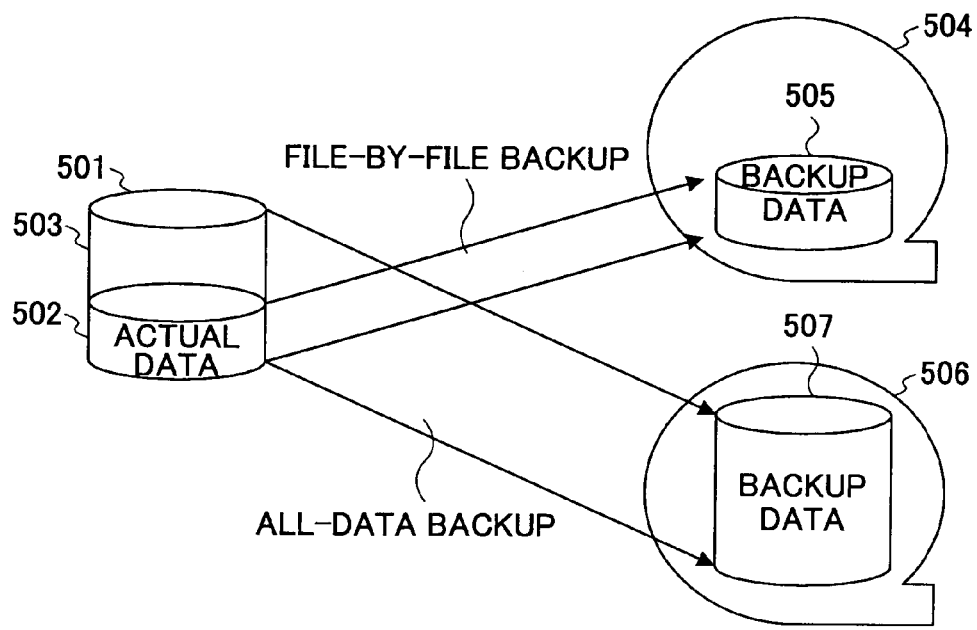
FIG. 5 is a diagram to explain file-by-file backup method and all-data backup method.
FIG. 6 shows an exemplary table for comparing the file-by-file backup method to the all-data backup method with respect to processing time and required backup capacity.
Figure 7:
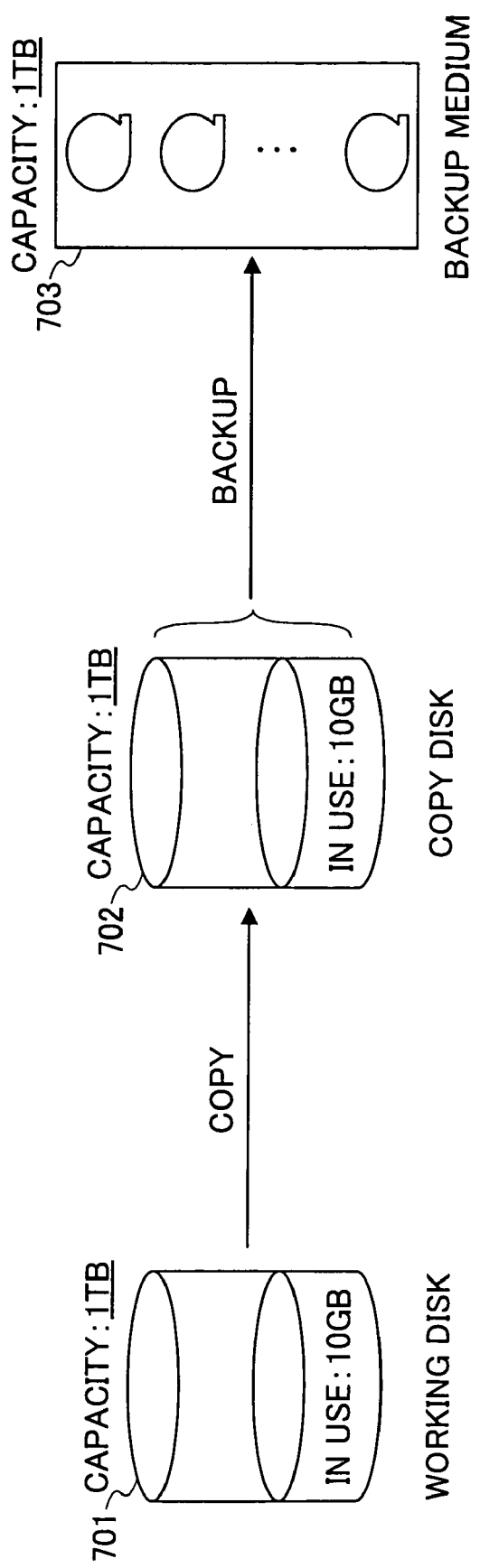
FIG. 7 is a diagram to explain an object to be solved by the present invention.

At step 1305, a data block table as described with respect to FIG. 3 is created for the working disk 901. The data block table is used for the above-mentioned subsequent copy disk creating operation. In this fashion, the copy disk 904 as described with respect to FIG. 3 is fictitiously created.

At step 1306, it is determined whether or not the copy disk creation instruction is appropriate to a disk copy request according to the present invention.

If it is determined that the copy disk creation instruction is not appropriate to such a disk copy request at step 1306, the process control proceeds to step 1308. On the other hand, if it is determined that the copy disk creation instruction is appropriate to such a disk copy request at step 1306, the process control proceeds to step 1307.

At step 1307, blocks to be copied according to the present invention are specified. Specifically, unused areas in the working disk 901 are truncated, and a destination block are designated for each of the specified blocks in such a way that a sequence of data elements in the actually used area 902 can be sequentially stored in individual logical addresses. Then, as mentioned with respect to FIG. 11, a block correspondence table to indicate a correspondence between logical addresses (for example, X1, X2, . . . ) in the copy disk 904 and logical addresses (for example, A1, A2, . . . ) in the working disk 901 is created.

At step 1308, the copy disk 904 is created in such a way that the sequence of data elements in the actually used area 902 can be sequentially stored in the logical addresses in the copy disk 904.

At step 1309, the created copy disk 904 is provided to the server so that the server can start a backup operation.

At step 1310, all data the copy disk 904 are backed up to the backup medium 905 in all-data backup manner.

At step 1311, the backup method according to the first embodiment is terminated.

In this fashion, a copy disk is created, and then the copy disk is backed up in all-data backup manner. As a result, it is possible to realize a backup method and a backup apparatus that can perform a backup operation at a high speed without any large-sized backup medium.

A description is given, with reference to FIG. 14, of a second embodiment of the present invention.

FIGS. 14A through 14C are diagrams to explain a recovery operation on backup data according to the second embodiment.

Referring to FIG. 14A, in the recovery operation, backup data in the backup medium 905 are first recovered in the virtual disk 904. In this case, the logical addresses X1, X2, . . . of the copy disk 904 are successively recovered in the corresponding block addresses 101, 102, . . . of the physical disk, as described with respect to FIG. 12. A virtual disk to which the backup data are recovered from the backup medium 905 may be different from the virtual disk 904. Since such a virtual disk to which the backup data are recovered from the backup medium 905 has configuration information on disk format according to the present invention, the target virtual disk is identifiable. Also, even if the backup data are recovered in a different virtual disk, the logical addresses X1, X2, of the copy disk 904 remain unchanged. Thus, . . . block addresses in the corresponding physical disk may become 201, 202, . . . The recovered copy disk is recovered in the virtual storage system layer as a logical disk having the capacity of 100 GB.

Then, the logical addresses X1, X2, . . . of the copy disk 904 are recovered in the logical addresses A1, A2, . . . in the working disk 901. The address recovery method is implemented in accordance with two approaches as follows.

Referring to FIG. 14B, in the first address recovery method, the copy disk 904 recovered from the backup medium 905 is used. First, the disk capacity information of the copy disk 904 is changed into 500 GB. Then, the logical addresses X1, X2, . . . in the virtual copy disk 904 as shown in FIG. 12 are converted into the logical addresses A1, A2, . . . as illustrated in the block correspondence table in FIG. 11. In this fashion, it is possible to recover a correspondence between the same logical addresses as the working disk 901 and the data elements stored in the addresses.

Referring to FIG. 14C, on the other hand, also in the second address recover method, backup data can be completely recovered. In the second address recovery method, first, backup data are written from the copy disk 904 to the original logical addresses in the working disk 901. For example, with reference to the allocation information table shown in FIG. 12, it can be determined that the block address 101 of the physical disk corresponding to the copy disk 904 corresponds to the logical address X1 in the copy disk 904. With reference to the block correspondence table shown in FIG. 11, it can be determined that the logical address X1 in the copy disk 904 corresponds to the block address A1 in the working disk 901. With reference to the allocation information table shown in FIG. 10, it can be determined that the block address A1 in the working disk 901 corresponds to the block address 1 in the physical disk corresponding to the working disk 901. As a result, data stored in the block address 101 in the physical disk corresponding to the copy disk 904 can be copied to the block address 1 in the physical disk corresponding to the working disk 901. In this fashion, it is possible to completely recover backup data in the physical disk corresponding to working disk 901.

According to the second embodiment, it is possible to recover backup data from a backup medium to a virtual disk.

FIG. 15 shows an exemplary structure of a computer system to implement the backup method according to the present invention.

Referring to FIG. 15, a computer system 1 includes CPU (Central Processing Unit) 2, a hard disk (HDD) 3, a memory 4, a display part 5, an input part 6 and a disk drive device 7. These components are connected to each other via a bus 8. CPU 2 performs various operations by loading programs stored in HDD 3 into the memory 4. Also, such programs may be loaded into the memory 4 from a computer recording medium such as a CD-ROM (Compact Disk-Read Only Memory) 9 via the disk drive 7.

The above-mentioned backup method and the backup apparatus can be implemented by the computer system 1. The computer system 1 can implement the backup method and the backup apparatus by executing a backup program in accordance with the flowchart as illustrated in FIG. 13. The backup program may be stored in HDD 3, CD-ROM 9 or other recording media.

The present invention is not limited to the specifically disclosed embodiments, and variations and modifications may be made without departing from the scope of the present invention.

What is claimed is:

1. A method of backing up data stored in a first virtual storage associated with a source physical storage into a backup medium, the source physical storage comprising a number of used blocks containing actual data and a number of unused blocks containing no actual data, the method comprising:

identifying the used blocks containing actual data in the source physical storage;

providing a second virtual storage associated with at least one physical storage, the second virtual storage being smaller than the first virtual storage and having a size corresponding to the number of used blocks containing actual data stored in the first virtual storage;

creating an address correspondence table between one or more block addresses of the actual data in the first virtual storage and sequential block addresses in the second virtual storage;

copying the actual data from the block addresses of the source physical storage to the sequential block addresses of the at least one physical storage in accordance with the created address correspondence tables; and backing up all the actual data from the at least one physical storage to the backup medium by copying all the block addresses of the at least one physical storage regardless of whether the block addresses of the at least one physical storage includes the actual data.

2. The method as claimed in claim 1, wherein the backing up all the actual data comprises recording the address correspondence tables and an address correspondence table between block addresses of the source physical storage and block addresses of the first virtual storage in the backup medium.

3. The method as claimed in claim 2, wherein the creating an address correspondence table comprises removing one or more unused block addresses of the source physical storage.

4. A virtual storage system for backing up data in a backup medium, comprising:

a first storage virtually storing data including actual data;

a source physical storage associated with the first virtual storage, the source physical storage comprising a number of used blocks containing actual data and a number of unused blocks containing no actual data;

a second virtual storage virtually storing actual data copied from the first virtual storage, wherein said second virtual storage is associated with the first virtual storage, the second virtual storage being smaller than the first virtual storage and having a size corresponding to the number of used blocks containing actual data stored in the first virtual storage; and at least one physical storage physically storing actual data copied from the source physical storage, wherein the physical storage is associated with the second virtual storage and the actual data is copied in accordance with an address correspondence table between one or more block addresses of the actual data in the first virtual storage and sequential block addresses in the second virtual storage, wherein all the actual data is backed up from the physical storage to the backup medium by copying all the block addresses of the at least one physical storage regardless of whether the block addresses of the at least one physical storage includes the actual data.

5. The virtual storage system as claimed in claim 4, wherein the backup medium further physically stores the address correspondence tables and an address correspondence table between block addresses of the source physical storage and block addresses of the first virtual storage.

6. The virtual storage system as claimed in claim 5, wherein the second address correspondence table is created by removing one or more unused block addresses of the source physical storage.

7. A computer-readable medium storing instructions to back up data stored in a first virtual storage associated with a source physical storage in a backup medium, the source physical storage comprising a number of used blocks containing actual data and a number of unused blocks containing no actual data, the instructions when executed by one or more processors causes the one or more processors to execute the process comprising:

identifying the used blocks containing actual data in the source physical storage;

providing a second virtual storage associated with at least one physical storage, the second virtual storage being smaller than the first virtual storage and having a size corresponding to the number of used blocks containing actual data stored in the first virtual storage;

creating an address correspondence table between one or more block addresses of the actual data in the first virtual storage and sequential block addresses in the second virtual storage;

copying the actual data from the block addresses of the source physical storage to the sequential block addresses of the at least one physical storage in accordance with the created address correspondence tables; and backing up all the actual data from the at least one physical storage to the backup medium by copying all the block addresses of the at least one physical storage regardless of whether the block addresses of the at least one physical storage includes the actual data.

8. The computer-readable medium as claimed in claim 7, wherein the backing up all the actual data comprises recording the address correspondence tables and an address correspondence table between block addresses of the source physical storage and block addresses of the first virtual storage in the backup medium.

9. The computer-readable medium as claimed in claim 8, wherein the act of creating an address correspondence table comprises removing one or more unused block addresses of the source physical storage.

* * * * *